March 20, 1962     D. W. SCHEER     3,026,503
SLEEP WARNING SYSTEM FOR VEHICLE OPERATOR
Filed Nov. 13, 1957
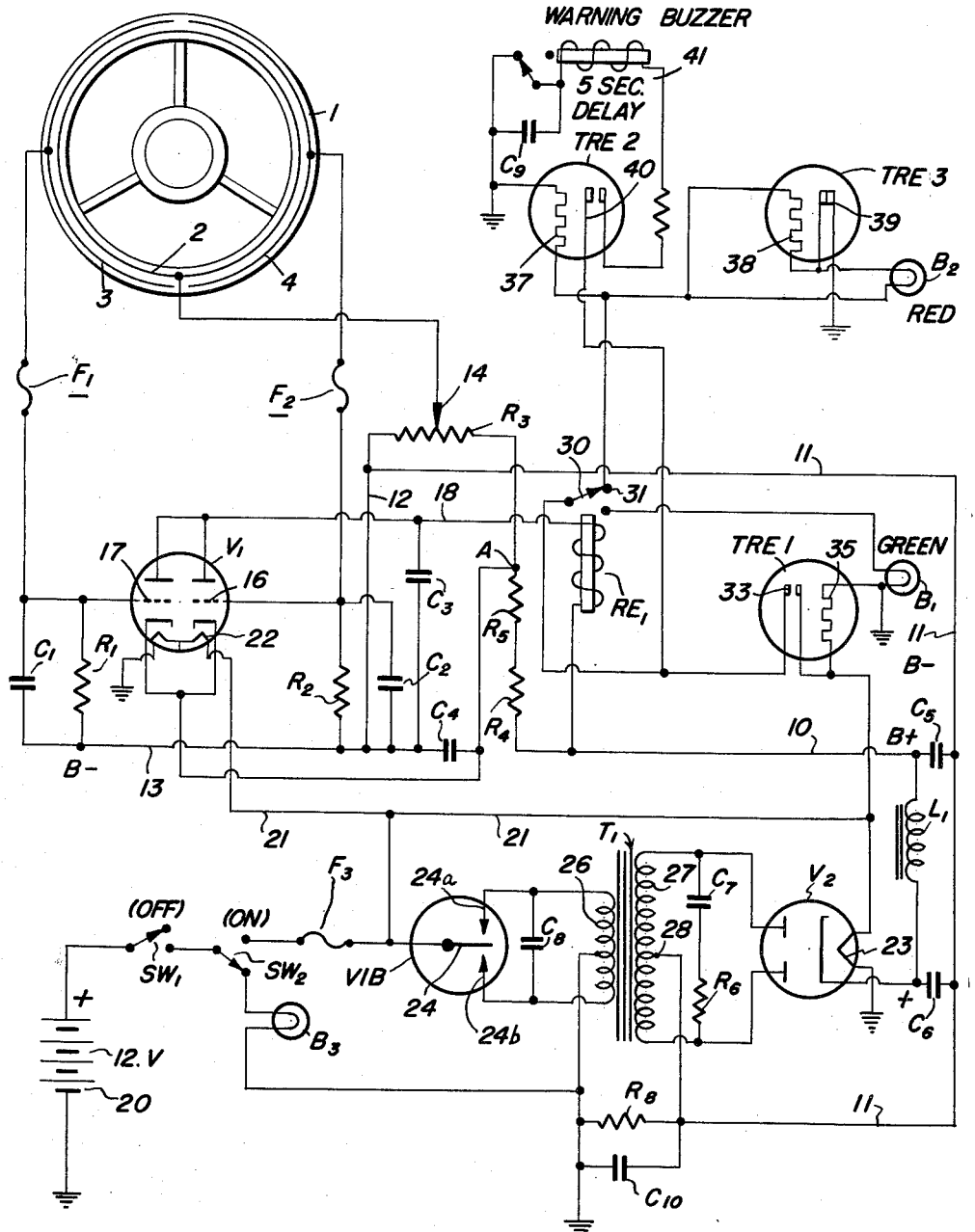
INVENTOR
DONALD W. SCHEER
BY *Hurwitz & Rose*
ATTORNEYS,

United States Patent Office 3,026,503
Patented Mar. 20, 1962

3,026,503
SLEEP WARNING SYSTEM FOR VEHICLE OPERATOR
Donald W. Scheer, 3004 S. Abingdon St., Arlington, Va.
Filed Nov. 13, 1957, Ser. No. 696,159
10 Claims. (Cl. 340—279)

The present invention relates generally to systems for warning the driver of any type of vehicle of his physically or psychologically undesirable state, and more particularly to systems for warning the driver of a vehicle of his dangerous physical or psychological condition in response to a measurement of the palmar resistance of the driver.

Psychologists have experimented for many years with psychogalvanometers, in order to collect data and information in the interest of psychological and medical research. There exists adequate experimental evidence indicating that the palmar areas of the human body are electrically conditioned in accordance with the degree of mental alertness, or the state of approaching drowsiness, or the state of physical and mental relaxation which precedes sleep, or abnormal body temperature of a subject. The period preceding sleep in particular is accompanied by a continuous increase of palmar resistance, which persists until the subject falls asleep.

Drivers of vehicles, and particularly of motor vehicles, are accident prone when they are drowsy. It is obviously not sufficient, to avoid driving hazards, to warn a person of drowsiness after he has fallen asleep, or after his eyes have closed, or upon other symptoms of extreme loss of body control or mental alertness. It is essential, on the other hand, that the driver of a vehicle be warned of approaching drowsiness, since even a slight failure of alertness, or a near approach to a condition of sleepiness constitutes a severe danger to the average driver.

A further danger which exists in driving any vehicle relates to the fatigue of the driver. It is not essential that a driver approach drowsiness in order that he become accident prone. After a long period of driving, an accident prone condition obtains due to fatigue. It is accordingly essential in a device for protecting the driver of a vehicle against accidents or hazards due to his own physical or psychological condition, that he be warned of fatigue as well as of approaching drowsiness.

It is observed, also, that when a driver has become drowsy, but before sleep ensues, he passes through a state of relaxation. In this state the hands of the driver no longer firmly grip the steering wheel, or other control elements of his vehicle. It is desirable for the purposes of the present invention, to provide a warning of an excessively relaxed state of a driver.

A further dangerous condition of drivers of automotive vehicles relates to state of health, and particularly to body temperatures of drivers. Drivers of automobiles and the like, are accident prone when they become feverish, and require warning of this condition.

The present invention operates by virtue of the fact that palmar resistance of a subject increases due to fatigue or drowsiness, or high body temperature, or excessive relaxation. In accordance with the principles of the present invention, palmar resistance forms a part of a voltage dropping network. As palmar resistance increases, the voltage drop across the network decreases. When the voltage drop across the network has decreased to a critical value, the conductive condition of a normally conducting vacuum tube is changed in response thereto, and certain warning devices are operated. It is found that if the voltage drop across two points of the palm of the normal human body is approximately three quarters of a volt D.C., the current which flows in response to this voltage will be of the order of ten microamperes, in one embodiment of the present system. Accordingly, the applied voltage presents no danger to the subject and in fact is so low that he is not conscious of same. Measurements have indicated that the palmar resistance in a typical installation for an alert subject is in the neighborhood of 100,000 ohms or less. It is further found that when the resistance value increases to upwards of 300,000 ohms that a danger point has been reached, and accordingly that an alarm should be given.

It is an important feature of the present invention, that the electrodes form a part of the steering wheel of a vehicle, or other hand grip. Different individuals will register slightly different degrees of mental alertness and attention for any given value of palmar resistance between electrodes, when the grip is firm. I need not and do not rely entirely on measurement of palmar resistance under firm grip conditions, however, because every person relaxes physically just prior to sleep, which implies a relaxation of the grip on the steering wheel or hand grip, and a consequent apparent increase of palmar resistance as measured by the instrument. It follows, that when true palmar resistance approaches anywhere near critical value, the sharp rise of palmar resistance as measured by the instrument, and which is due to physical relaxation of the grip due to approaching sleep, effects a sharp and unmistakable passage of palmar resistance, as measured by the instrument, to a value far beyond the critical value.

The reliance which I place on a combination of physiological and physical relaxation, i.e., failure of mental alertness and relaxation of the grip, is completely foolproof.

I have found that it is impossible to maintain a normal grip on the steering wheel, or other hand grip, of a vehicle, just prior to going to sleep, and that alcohol, fatigue or drowsiness all have similar effects on both palmar resistance and physical relaxation of the grip.

It is, however, true that individual subjects react differently within a relatively small range. It has been found that most subjects have approached a state of drowsiness or fatigue when their palmar resistance has attained a value of 300,000 ohms. Some individuals, however, depart from this rule, and for these individuals an adjustment is provided in the equipment to compensate for their departure from the average. Obviously, the normal palmar resistance is also a function of the spacing of the electrodes and the dimensions of the electrodes which are used to measure the resistance. For that reason, adjustment is provided in the system to compensate for any variations of electrode spacing and composition which may occur in practice.

It is, accordingly, a broad object of the present invention to provide a novel system for indicating the onset of physically or psychologically hazardous conditions in a driver of a vehicle.

It is a further object of the invention to provide a safety or warning device embodying electronic principles for providing an indication of the physiological condition of the body of the driver of a vehicle, for the purpose of warning the operator that he is no longer alert, or is in a condition which is hazardous for driving.

It is another object of the invention to provide a system of secondary warnings, in response to continued inattention of a driver or passenger, to an initial warning, and more specifically the provision of a warning buzzer which operates in response to continued inattention to a warning light.

The above and still further features, objects and advantages of the present invention will become apparent upon consideration of the following detailed disclosure of a specific embodiment thereof, especially when taken in conjunction with the accompanying drawings, wherein:

The single FIGURE is the schematic diagram of a system according to the present invention.

Referring now more specifically to the accompanying drawings, the reference numeral 1 represents the steering wheel of a vehicle, particularly of an automotive vehicle. It will be understood that for the steering wheel may be substituted other control elements of a vehicle, when these are appropriate. Modern aircraft, for example, normally employ wheels or sticks which control both direction and altitude of the aircraft and these are obviously included within the scope of the invention.

Mounted on the steering wheel 1, and extending completely around the circumference thereof either on the under or over side thereof, is a ring 2 of conductive material. Extending around the ring 2 are two half rings 3 and 4. The electrodes 2, 3, 4 may be fabricated of silver in the form of bars, embedded in the hand wheel of the automobile, or a detachable set of electrodes may be employed which may be secured to the conventional and usual wheel in any convenient fashion.

Attention is initially invited to the B+ lead 10 and to the B— lead 11. The latter proceeds to the lead 12 which in turn connects directly to a B— lead 13. Connected between the electrode 3 and the B— lead 13 is a resistance R1 in series with a fuse F1. Resistance R1 may be shunted by smoothing condensers C1. In series between electrode 4 and the B— lead 13 is a further resistance R2 in series with a fuse F2. Resistance R2 may be shunted by a smoothing condenser C2. Electrode 2, which is common to electrodes 3 and 4, is connected to an adjustable slider 14 of a potentiometer R3. The latter is connected at one terminal to the B— lead 12, and at its other terminal is connected via resistances R4, R5 to the B+ lead 10. Accordingly, an adjustable voltage appears at the slider 14, and this slider is utilized to determine the value of voltage which will be applied between the electrodes 2, 3 and 2, 4. A single pre-adjusted position of the slider 14 may be effective for the vast majority of people. However, when the palmar resistance of a subject is unusual, the position of the slider 14 may be adjusted to compensate.

One end of resistance R2 is connected to one grid 16 of a twin triode V1. One end of resistance R1 is similarly connected to the other grid 17 of the triode V1. The plates of the triode V1 are connected together and via a line 18 to one side of a relay RE1, the other side of which is connected to the B+ line 10. Accordingly, the coil of relay RE1 is connected in series with the plates of the double triode V1. The cathodes of the double triode V1 are connected to the junction A between resistance R5 and potentiometer R3 and are accordingly at positive potential but at a lower potential than the potential of the B+ lead 10. A smoothing condenser C3 may be connected between the anodes of tube V1 and B— lead 13, and a further smoothing condenser C4 may be connected between junction A and B— lead 13. The difference in voltage between the cathodes and the grids of the tube V1 effects a negative bias on the tube V1 since the cathodes are brought to a higher positive potential than the grids.

The system is operated from a battery 20 which, for the sake of example, may be taken to be a 12 volt ignition and starting battery of an automotive vehicle. The negative terminal of the battery is grounded and the positive terminal is connected via an on-off switch SW1 (which may be an ignition switch) and via a further on-off switch SW2 in series with the first switch. The "on" terminal of the first on-off switch SW1 is connected to the wiper arm of the second switch SW2. The "off" terminal of the latter switch is connected through a lamp B3 to ground, so that a visual indication is provided whenever the equipment is disconnected from the battery 20, while switch SW1 is "on." When the switch SW1 is in "on" condition and the switch SW2 is likewise in "on" condition, a circuit is made from the positive terminal of the battery 20 through a fuse F3 to a line 21. The latter line supplies current to the heaters 22 of the tube V1, and also the heater 23 of a full wave rectifier V2. The line 21 is further connected to a vibrating element 24 of a mechanical vibrator VIB having two stationary contacts 24a and 24b, between which the vibrating element 24 alternates. Across the stationary contacts 24a and 24b is connected a primary winding 26 of a transformer T1, a condenser being connected across the primary winding 26 in order to eliminate switching transients. The secondary winding 27 of the transformer T1 is connected at its alternate ends to the anodes of the full wave rectifier V2, the cathode of which is connected in series with a filter choke L1 to the B+ terminal 10. The center tap 28 of the secondary winding 27 of transformer T1 is connected to the B— line 11. Filter condensers C5 and C6 are connected between the line 11 and the terminals of the choke L1, and serve to filter the voltage supply. Condenser C7 and resistance R6 are connected in series across secondary winding 27 to damp out oscillations and spurious peaks. The total voltage available from the system is of the order of 260 volts D.C. Condenser C10 is used to by-pass any A.C. which may exist between the negative terminal 11 and the battery ground. The resistance R8 is employed as a bleeder resistance to tie the B— section to the ground section of the 12 volt supply, and to isolate the battery ground in the B— system for D.C.

If the body resistance of a subject is low, the voltage across resistance R1 and R2 will be relatively high, since and accordingly tube V1 will be conductive. On the other hand when body resistance increases beyond a critical point, the bias on the tube V1 changes so as to render the tube V1 insufficiently conductive to actuate relay RE1. Since the relay coil RE1 is in series with the anode circuits of the tube V1, current flow in the system may be adjusted to render the relay operative to actuate the armature 30 of the relay RE1 into down position as long as the subject is alert and is not approaching drowsiness or a fatigued condition, or any condition to which the system is sensitive. When the subject becomes drowsy or approaches fatigue or shows excessive fatigue, or a high temperature, or is unduly relaxed, a bias is developed at the grids of the double triode V1 sufficient to render the relay RE1 ineffective to pull down the armature 30 of the relay RE1. Accordingly, the armature 30 moves to its upper contact 31. When the armature 30 is in a downward position it completes a circuit to a green indication lamp B1, provided the contacts of the thermal relay TRE1 are closed, the circuit for lamp B1 extending from the lead 21 through the contacts 33 through the forward contacts of the relay RE1 through the lamp B1 and to ground. Since the normal condition of the relay RE1 is the energized condition, it will be apparent that the green lamp B1 will be lighted so long as the subject is normal.

The heater element 35 of the thermal relay TRE1 is connected between the leads 21 and ground so that it is in effect connected directly across the battery 20 whenever the switches SW1 and SW2 are on. Switch SW1 may be the ignition switch of an automotive vehicle, which assures that the system of the invention does not operate when the motor of the vehicle is not operating. The second switch SW2 relates directly to the instrument itself and enables it to be turned off regardless of the operating condition of the vehicle. Accordingly, when the instrument is initially turned on, the heater 35 heats up, closes the contacts 33 and applies voltage to arm 30 of relay RE1. Voltage is then applied to the green lamp circuit from the lower contact of relay RE1. The green lamp B1 remains on until the instrument warns the driver of the danger of a hazardous condition. It will be noted that the green light can remain on only so long as the battery is connected, and only so long as the tube V1 and its associated circuits are operative, and only so long as the relay RE1 is energized. Failure of the tube, for example, causes the armature 30 to move up to its back armature 31, thereby to provide a warning to the subject. In this respect the system is failsafe.

Similarly, the subject is warned whenever his palmar resistance rises sufficiently to deenergize the relay RE1. In the back contact condition of the armature 30, circuits are made in parallel from the lead 21 through the contacts 33 to heater elements 37 and 38 of thermal relays TRE2 and TRE3. The relay TRE2 is set for a five second delay while the relay TRE3 includes normally closed contacts 39, so that red lamp B2 is operated concurrently with de-energization of the relay RE1. The thermal relay TRE3 is a flashing relay, since when the heater element has provided sufficient heat, the contacts 39 open, permitting the heater element to cool down. This in turn causes the contacts 39 to close again, and the operation continues cyclically. In circuit with the contacts 39 is the red flasher light, which flashes on and off to provide an optical warning to the subject.

After a period of five seconds the heater element 37 has heated the contacts 40 of the relay TRE2 sufficiently to close these, whereupon a direct circuit is provided between the lead 21 and a warning buzzer 41. The latter is of conventional character per se and accordingly is not described in detail. However, the warning buzzer 41 operates in conjunction with the red lamp B2 to warn the subject. The red lamp B2 operates immediately and the buzzer is supplementary, in the event that the flashing red lamp B2 should be ignored by the subject.

Tracing now the operation of the present system in a general way, it will be apparent that the palmar resistance of a subject is being continually measured, his hands remaining on the steering wheel during the measurement. So long as the subject is in an alert condition, is not drowsy, is not unduly relaxed nor fatigued and does not have an unduly high body temperature, sufficient bias is provided at the grids of the tube V1 to cause sufficient current flow to maintain the relay RE1 energized. So long as the relay RE1 is energized green lamp B1 is energized to indicate to the operator that he is not in a hazardous psychological or physical condition. When the subject arrives at a hazardous physical or psychological condition his palmar resistance has risen to a point sufficient to apply negative bias to the tube V1 sufficient for de-energizing the relay RE1. At that time a flashing red warning light B2 is energized, and the "safe" or green light B1 is turned off. The red light flashes intermittently for a short period of time, and if the subject does not take adequate action prior to the end of that time, a warning buzzer 41 is turned on, and continues to buzz until the operator becomes sufficiently alert to realize that something is wrong and take corrective action. Presumably having received a warning, he will then take steps to reduce his state of fatigue or his approaching drowsiness, or will stop his vehicle, and a great many accidents involving vehicles will thereby be avoided.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A system for warning the driver of a vehicle of a psychologically or physically undesirable condition, comprising a pair of separated contacts positioned on a control element of the vehicle which may be bridged by a single body element of said driver, means for applying a predetermined voltage to said separated contacts, circuit means responsive to amplitude of current flow in response to said voltage, and indicator means responsive to said circuit means for providing a warning signal in response to attainment of less than a predetermined amplitude of said current flow.

2. A system for warning the driver of a vehicle of his approaching drowsiness, comprising means positioned on a control element of the vehicle for measuring the resistance between predetermined points of a palm of said driver, an alarm, and means for operating said alarm in response to said means for measuring and on a predetermined rise of said resistance as measured by said means for measuring.

3. In combination, a pair of palmar electrodes, a circuit for applying an adjustable voltage between said palmar electrodes, said circuit including a series resistance, whereby a voltage is developed across said series resistance which is inversely proportional to the resistance between said palmar electrodes, a vacuum tube having a plate, a grid and cathode, means for connecting said grid and cathode across said resistance in such polarity as to increase plate current as a direct function of voltage across said resistance, a relay having a coil connected in series with said anode and responsive to said anode current, said relay having an armature movable to a front contact only in response to current flow in said coil of at least a predetermined value, said relay having a back contact, and means for indicating the contact of said armature with said back contact.

4. The combination according to claim 3, wherein is provided a battery source of low voltage D.C. power, means for converting said D.C. power to high voltage alternating current power, and rectifier means for converting said A.C. power to high voltage D.C., said vacuum tube having a heater, and means for supplying said heater with heating power directly from said battery source and said plate with D.C. voltage from said rectifier means.

5. The combination according to claim 3, wherein said means for indicating comprises a relatively fast acting visual indicator and a relatively slowly operative aural indicator, and separate thermal relays for energizing each of said indicators.

6. In combination, a pair of body electrodes, a circuit for applying a voltage between said body electrodes, said circuit including a series resistance, whereby a voltage is developed across said series resistance which is inversely proportional to the resistance between said body electrodes, an amplifying element having a common electrode, a control electrode, and an output electrode, means for connecting said control electrode and said common electrode across said resistance, a control element connected to said output electrode responsive to a predetermined value of said output current to change its state, said predetermined value of said output current being generated only in response to resistance between said electrodes above a predetermined value, a first visual indicator and a second aural indicator, indicator actuating means responsive to said change of state of said control element upon a predetermined change of said output current to activate the said first visual indicator immediately upon said predetermined change of state and to activate said second aural indicator on elapse of a fixed time interval after the said change of state.

7. The combination according to claim 6 wherein said indicator activating means comprises separate thermal relays for energizing each of said indicators.

8. A system for warning a vehicle operator of when he attains an inattentive condition comprising a pair of mutually insulated electrodes constantly engaged by said operator while operating said vehicle, said electrodes being mounted on a manual control element of said vehicle and having a spatial separation less than the greatest distance between points on the hand of said operator, and an indicator responsive only to a predetermined increase of resistance of the hand between said electrodes, said predetermined resistance increase being commensurate with the state of inattention of said operator.

9. The combination according to claim 8 wherein is provided a steering wheel of a vehicle, said electrodes being secured about the rim of said steering wheel.

10. The combination according to claim 8 further including a voltage divider including said electrodes and an impedance element, wherein said indicator includes an amplifier having an input circuit and an output circuit, said input circuit being connected across the impedance element of said voltage divider, a relay connected in said output circuit, said relay having at least back and forward contacts, and an armature movably selectively between said back and forward contacts, and different warning means operative in response to the actuated and unactuated conditions of said armature.

References Cited in the file of this patent

UNITED STATES PATENTS

| | | |
|---|---|---|
| 2,379,955 | Eilenberger | July 10, 1945 |
| 2,625,594 | Mathis | Jan. 13, 1953 |
| 2,799,269 | Mathison | July 16, 1957 |
| 2,829,638 | Douglas | Apr. 8, 1958 |

FOREIGN PATENTS

| | | |
|---|---|---|
| 878,467 | Germany | June 1, 1953 |

OTHER REFERENCES

Richter: The Significance of Changes in the Electrical Resistance of the Body During Sleep, Proc. N.A.S., vol. 12, 1926, pages 214–222.

Bohr: Lie Detector, Radio and Television News, June 1953, pages 56, 57 and 124.